United States Patent [19]

Burkhart

[11] Patent Number: 5,296,422

[45] Date of Patent: Mar. 22, 1994

[54] MOLYBDENUM TRIOXIDE BONDED BASIC MONOLITH AND METHOD

[75] Inventor: Andrew M. Burkhart, West Mifflin, Pa.

[73] Assignee: Dresser Industries, Inc., Dallas, Tex.

[21] Appl. No.: 53,303

[22] Filed: Apr. 26, 1993

Related U.S. Application Data

[63] Continuation of Ser. No. 714,474, Jun. 13, 1991, abandoned.

[51] Int. Cl.$^5$ .................. C04B 35/04; C04B 35/06
[52] U.S. Cl. ........................ 501/108; 501/113; 501/121
[58] Field of Search ............... 501/108, 110, 115, 116, 501/117, 118, 120, 121, 132

[56] References Cited

U.S. PATENT DOCUMENTS

| | | | |
|---|---|---|---|
| 3,522,065 | 7/1970 | Herron | 501/114 |
| 3,528,830 | 9/1970 | Davies | 501/114 X |
| 4,028,124 | 6/1977 | Bihuniak et al. | 106/69 |
| 4,099,949 | 7/1978 | Olds | 65/17 |
| 4,292,081 | 9/1981 | Watanabe et al. | 501/96 |
| 4,407,970 | 10/1983 | Komatsu et al. | 501/97 |
| 4,544,643 | 10/1985 | Fraser | 501/127 |
| 4,549,677 | 10/1985 | Marino et al. | 501/123 X |
| 4,568,652 | 2/1986 | Petty, Jr. | 501/127 |
| 4,682,717 | 7/1987 | Marino et al. | 501/123 X |
| 4,752,424 | 6/1988 | Matsuda et al. | 264/1.2 |
| 4,863,516 | 9/1989 | Mosser et al. | 106/14.12 |
| 4,863,882 | 9/1989 | Matsuda et al. | 501/94 |
| 4,983,554 | 1/1991 | Hsieh | 501/97 |

FOREIGN PATENT DOCUMENTS

| | | | |
|---|---|---|---|
| 1081140 | 3/1984 | U.S.S.R. | |
| 1085961 | 4/1984 | U.S.S.R. | 501/117 |
| 1186608 | 10/1985 | U.S.S.R. | |

OTHER PUBLICATIONS

Ceramic Industry, "Raw Materials Handbook", vol. 126, No. 1, p. 111 (1986).

Primary Examiner—Karl Group
Attorney, Agent, or Firm—Baker & Botts

[57] ABSTRACT

The problems associated with the use of chromic acid ($CrO_3$) binders are substantially overcome by a basic refractory monolith incorporating molybdenum trioxide (molybdic oxide, $moO_3$) as the binding agent. In accordance with a preferred embodiment, the basic monolith contains about 0.5 wt. % pH modifier, such as sodium carbonate; about 2 wt. % molybdic oxide ($MoO_3$); about 3 wt. % crude clay; and 75 to 99 wt. % basic refractory aggregate.

9 Claims, No Drawings

MOLYBDENUM TRIOXIDE BONDED BASIC MONOLITH AND METHOD

This application is a continuation of application Ser. No. 07/714,474 filed on Jun. 13, 1991, now abandoned.

BACKGROUND OF THE INVENTION

This invention relates to basic refractory monoliths and, more particularly, it concerns a molybdenum trioxide bonded basic refractory and method.

Basic monoliths are refractory compositions which are either preformed or formed on site. They are installed by various forming techniques, such as casting, fettling, gunning, spraying, troweling, or in some cases by pressing. The term "basic" implies that the major component in the mix is a base oxide, such as lime, magnesia, or a combination of these common refractory oxides.

In the past, chromic acid ($CrO_3$) has been the preferred binder for basic monoliths. Use of this binder imparted monolithic shapes with exceptional strength and slag resistance. Chromic acid contains the element chromium in the +6 valence state which is commonly referred to as hexavalent chrome.

While use of the chromic acid binder has provided adequate utility, recently, there has been a great deal of concern over the use of chromic acid because chromium +6 may be toxic and carcinogenic. For example, the EPA has forbidden routine disposal of materials containing more than 5 ppm of soluble chromium.

The refractory industry, in response to EPA concerns, has abandoned the use of chromic acid as a binder and has used as substitutes epsom ($MgO \cdot SO_4 \cdot 7H_2O$) salts, phosphates, silicates, nitre cake ($NaH \cdot SO_4 \cdot H_2O$), sulfamic acid ($H\ SO_3 \cdot NH_2$), citric acid, and anhydrous boric acid ($H_3 \cdot BO_3$) either individually or in combination. Although these substitute binders have provided adequate service, they have not provided equivalent service to that achieved using chromic acid.

In light of the foregoing, there is a need for an improved basic refractory monolith including a binder which provides desired levels of slag resistance and strength and is environmentally safe.

SUMMARY OF THE INVENTION

In accordance with the present invention, the problems associated with the use of chromic acid ($CrO_3$) binders are substantially overcome by a basic refractory monolith incorporating molybdenum trioxide ($MoO_3$) as the binding agent.

It has been unexpectedly discovered that molybdenum trioxide (also referred to as molybdic oxide) is an effective substitute for chromic acid in basic monoliths. Molybdic oxide ($MoO_3$) is non-toxic, non-carcinogenic, and, as such, provides a refractory which is safe to handle and dispose of.

Also, it was found that small additions of $MoO_3$ and a base, such as sodium hydroxide or sodium carbonate, to deadburned magnesite mixes allowed the mixes to develop a set at room temperature within an hour. Such a property is desired as these mixes are often installed between forms, the forms stripped soon after, and then heat is applied to sinter the monolith. Simple drying of the monolith to temperatures of 250° F. resulted in a dramatic increase of strength. A strong basic organic pH modifier such as triethylamine may also be used.

Additionally, molybdic oxide is only partially soluble in water. This is an important feature since there is less tendency for the molybdic oxide to migrate during drying of the shape. Conventional silicate and phosphate binders tend to be readily soluble in water. Hence, during drying of conventional monoliths, a gradient develops through the shape leaving a weak interior and a stronger exterior. Such a gradient is unacceptable in many applications.

Accordingly, a principal object of the present invention is to provide a basic refractory monolith having a molybdenum trioxide binder. Another and more specific object of the invention is the provision of a binder for basic monoliths which imparts the desired levels of strength, is environmentally safe, provides a set at room temperature within a desired time span, and provides the monolith with slag resistance comparable to chromic acid bonded shapes. Other objects and further scope of applicability of the present invention will become apparent from the detailed description to follow taken in conjunction with the accompanying tables.

DETAILED DESCRIPTION OF THE PREFERRED EMBODIMENT

In accordance with the present invention, the problems associated with the use of chromic acid ($CrO_3$) binders are addressed by a basic refractory monolith incorporating molybdenum trioxide (molybdic oxide, $MoO_3$) as the binding agent. The aggregate used to make the monolith may be deadburned magnesite, calcined dolomite, magnesium aluminate spinel, chrome ore and combinations thereof. It is to be understood that the refractory monolith of the present invention is suited for refractory applications including mortars, shapes, grouts, plastics, castables, dry mixes, and wet mixes.

Molybdic oxide ($MoO_3$) is less soluble than chromic acid in water. It appears that the solubility or at least reactivity of $MoO_3$ can be maximized by the addition of a high pH solute to the water. Experiments showed that ground sodium hydroxide additions to a deadburned magnesite mix which contained small additions of $MoO_3$ resulted in an initial set at room temperature within an hour (Table I). Other bases provided similar results, but require more time to develop a set. Additions of boric acid and citric acid seemed to retard the air set. Reagent grade sodium carbonate was found to be effective although it is assumed that common soda ash would probably have the same effect as a pH modifier.

TABLE I

100% Deadburned Magnesite Fines
Plus additions:

2% Molybdic Trioxide
1% Sodium Hydroxide
25% Water

Above mixture develops an air set within one hour.

Initial development of molybdic oxide containing mixes is shown in Table II. Mixes A to E involve a study of various grinds and two levels of sodium carbonate either with and without a starch addition to the mix. Mix C, a fine grind mix with a lower level of sodium carbonate, was the best gunning mix of the series. Mix C had a low water requirement, formed a firm panel when gunned, and only had moderate rebounds.

TABLE II

| Mix: | Mix Development | | | | | Comparative Data | | |
|---|---|---|---|---|---|---|---|---|
| | A | B | C | D | E | | | |
| Deadburned Magnesite, 4/10 mesh | 28% | 15% | 15% | 28% | 15% | Deadburned Magnesite Gunning Mix W/Epsom Salt Bond | Deadburned Magnesite Gunning Mix w/Chromic Acid Bond Brand A | Deadburned Magnesite Gunning Mix w/Chromic Acid Bond Brand B |
| Deadburned Magnesite, 10/28 mesh | 48 | 50 | 50 | 48 | 50 | | | |
| Deadburned Magnesite, −28 mesh | 11 | 24 | 24 | 11 | 24 | | | |
| Deadburned Magnesite, Fines (55% −325 mesh) | 7 | 5 | 5.5 | 7 | 5.5 | | | |
| Crude Clay | 3 | 3 | 3 | 3 | 3 | | | |
| Molybodic Oxide | 2 | 2 | 2 | 2 | 2 | | | |
| Sodium Carbonate | 1 | 1 | 0.5 | 1 | 0.5 | | | |
| Plus Additions Starch | — | — | — | 0.5 | 0.5 | | | |
| Moisture Required to Achieve a Gunning Consistency, % | 9.4 | 8.3 | 6.8 | 6.8 | 10.4 | 12.7 | 6.0 | 6.5 |
| Gunning Characteristics: | OK | Better Than A | Better Than A Or B | Not As Good as C | OK | Poor | Poor | OK |
| Properties of Gunned Panels | | | | | | | | |
| Bulk Density, pcf - After Drying at 250° F.: | 163 | — | — | 154 | 153 | 156 | 163 | 170 |
| After 3000° F. Reheat: | 155 | — | — | 145 | 150 | — | — | — |
| Modulus of Rupture, psi | | | | | | | | |
| After Drying at 250° F.: | — | — | — | 860 | 960 | 600 | 1290 | 950 |
| After 3000° F. Reheat: | 510 | — | — | 460 | 620 | — | — | — |
| At 2500° F.: | 10 | — | — | — | — | — | — | — |
| Cold Crushing Strength, psi | | | | | | | | |
| After Drying at 250° F.: | — | — | — | 2870 | 4200 | 4550 | 6440 | 5110 |
| After 3000° F. Reheat: | 400 | — | — | 650 | 910 | — | — | — |
| 3000° F. Reheat | | | | | | | | |
| % Linear Change: | +0.3 | — | — | +0.5 | −0.2 | — | — | — |
| % Volume Change: | −0.4 | — | — | −1.1 | −3.3 | — | — | — |
| Desired Screen Analysis | | | | | | | | |
| 4 on 10 mesh | 25 | 14 | — | — | — | — | — | — |
| 10 on 28 mesh | 45 | 45 | — | — | — | — | — | — |
| 28 on 65 mesh | 10 | 16 | — | — | — | — | — | — |
| −65 | 20 | 25 | — | — | — | — | — | — |
| −325 | 10-15 | 10-15 | — | — | — | — | — | — |

A commercially available molybdic oxide that is useful in the practice of the present invention is a Noranda molybdic oxide product sized −20 mesh with a typical screen analysis of:
Company: Noranda
Product: Molybdic Oxide

| Typical Screen | |
|---|---|
| +20 M | 3-5 |
| −20 + 48 M | 10-15 |
| −48 + 65 M | 3-5 |
| −65 + 100 M | 3-5 |
| −100 + 200 M | 18-20 |
| −200 + 325 M | 15-25 |
| −325 | 30-35 |

A preferred embodiment of the invention provides a basic refractory mix consisting essentially of up to 5 wt %, preferably about 0.5 wt %, pH modifier, up to 10 wt %, preferably about 2 wt % molybdic oxide, up to 10 wt %, preferably about 3 wt % crude clay, and 75 to 99 wt % basic aggregate. Preferably, the size of the molybdic oxide particles is −20 mesh (smaller than −20 mesh), preferably −325 mesh.

Thus it will be appreciated that, as a result of the present invention, a highly effective basic monolith with an effective slag-resistant bond is provided by which the principal object and others are completely fulfilled. It is contemplated and will be apparent to those skilled in the art from the foregoing description and accompanying tables that variations and/or modifications of the disclosed embodiment may be made without departure from the invention. Accordingly, it is expressly intended that the foregoing description and accompanying tables are illustrative of a preferred embodiment only, not limiting, and that the true spirit and scope of the present invention be determined by reference to the appended claims.

What is claimed is:

1. A basic refractory mix consisting essentially of an amount up to 5 wt. % pH modifier, an amount up to 10 wt. % molybdic oxide, an amount up to 10 wt. % crude clay, and 75 to 99 wt. % of a basic aggregate selected from the group consisting of deadburned magnesite, calcined dolomite, and combinations thereof.

2. A basic refractory mix in accordance with claim 1 wherein said pH modifier is present in an amount from 0.5 to 5 wt. %, said molybdic oxide is present in an amount from 0.5 to 10 wt. %, and said crude clay is present in an amount from 0.5 to 10 wt. %.

3. A basic refractory mix in accordance with claim 2 wherein said basic refractory mix consists essentially of 0.5 wt. % pH modifier, 2 wt. % molybdic oxide, 3 wt. % crude clay, and 94.5 wt. % basic aggregate.

4. A basic refractory mix in accordance with claim 1 wherein said pH modifier is a highly basic compound.

5. A basic refractory mix in accordance with claim 4 wherein said pH modifier is selected from the group consisting of sodium carbonate, sodium hydroxide, and triethylamine.

6. A basic refractory mix in accordance with claim 1 wherein said molybdic oxide is in the form of particles sized essentially −20 mesh.

7. A basic refractory mix in accordance with claim 6 wherein said molybdic oxide is in the form of particles sized essentially −325 mesh.

8. A basic refractory mix in accordance with claim 1 wherein said basic aggregate is deadburned magnesite.

9. A basic refractory mix in accordance with claim 1 wherein said basic refractory mix consists essentially of (i) 0.5 wt % pH modifier selected from the group consisting of sodium carbonate, sodium hydroxide, and triethylamine, (ii) 2 wt. % molybdic oxide in the form of particles sized essentially −20 mesh, (iii) 3 wt. % crude clay, and (iv) 94.5 wt. % deadburned magnesite.

* * * * *

UNITED STATES PATENT AND TRADEMARK OFFICE
CERTIFICATE OF CORRECTION

PATENT NO. : 5,296,422
DATED : Mar. 22, 1994
INVENTOR(S) : Burkhart

It is certified that error appears in the above-identified patent and that said Letters Patent is hereby corrected as shown below:

On the title page, in Item No. [54] and Col. 1, lines 2 and 3 correct title to read MOLYBDENUM TRIOXIDE MONOLITH.

On the title page, in Item No. [73], correct the Assignee to read INDRESCO INC.

On the title page, in Item [57], on line 6, after "(molybdic oxide," please delete "moO$_3$" and insert --MoO$_3$--.

Column 1, line 37, after "sulfamic acid (" please delete "H SO$_3$" and insert --H•SO$_3$ --.

Column 5, line 5, after "(i) 0.5 wt", please insert --.--

Signed and Sealed this

Twenty-seventh Day of December, 1994

Attest:

BRUCE LEHMAN

*Attesting Officer*    *Commissioner of Patents and Trademarks*